US012261354B2

(12) United States Patent
Wu et al.

(10) Patent No.: US 12,261,354 B2
(45) Date of Patent: Mar. 25, 2025

(54) ANTENNA STRUCTURE

(71) Applicant: Wistron NeWeb Corp., Hsinchu (TW)

(72) Inventors: Tzu-Min Wu, Hsinchu (TW); Kuang-Yuan Ku, Hsinchu (TW); Kuo-Jen Lai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 200 days.

(21) Appl. No.: 18/328,938

(22) Filed: Jun. 5, 2023

(65) Prior Publication Data

US 2023/0411837 A1 Dec. 21, 2023

(30) Foreign Application Priority Data

Jun. 16, 2022 (TW) ................................ 111122401
May 19, 2023 (TW) ................................ 112118693

(51) Int. Cl.

| | |
|---|---|
| ***H01Q 5/328*** | (2015.01) |
| ***H01Q 1/36*** | (2006.01) |
| ***H01Q 1/48*** | (2006.01) |
| ***H01Q 5/371*** | (2015.01) |

(52) U.S. Cl.

CPC ................ *H01Q 1/36* (2013.01); *H01Q 1/48* (2013.01); *H01Q 5/328* (2015.01)

(58) Field of Classification Search

CPC ............ H01Q 1/36; H01Q 1/48; H01Q 1/243; H01Q 9/30; H01Q 9/0414; H01Q 5/371; H01Q 5/328; H01Q 5/385

See application file for complete search history.

(56) References Cited

U.S. PATENT DOCUMENTS

| | | | | |
|---|---|---|---|---|
| 11,588,245 | B2 | 2/2023 | Wei | |
| 2011/0122027 | A1* | 5/2011 | Wong ..................... | H01Q 9/045 343/700 MS |
| 2012/0001815 | A1* | 1/2012 | Wong .................. | H01Q 9/0421 343/843 |
| 2015/0188230 | A1* | 7/2015 | Kim ....................... | H01Q 5/364 343/700 MS |
| 2017/0084985 | A1* | 3/2017 | Ku ......................... | H01Q 1/243 |
| 2021/0050659 | A1* | 2/2021 | Yu .......................... | H01Q 5/335 |

FOREIGN PATENT DOCUMENTS

| | | |
|---|---|---|
| CN | 102144334 A | 8/2011 |
| TW | 202021188 A | 6/2020 |

* cited by examiner

*Primary Examiner* — Thai Pham
(74) *Attorney, Agent, or Firm* — McClure, Qualey & Rodack, LLP

(57) ABSTRACT

An antenna structure includes a ground element, a feeding radiation element, a first radiation element, a second radiation element, a first coupling branch, an inductive element, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The first coupling branch is coupled through the inductive element to a first grounding point on the ground element. The first coupling branch includes an elevated portion extending across the first radiation element. The ground element, the feeding radiation element, the first radiation element, the second radiation element, the inductive element, and the first coupling branch are disposed on the same surface of the dielectric substrate.

20 Claims, 10 Drawing Sheets

100

200

761

762

763

ANTENNA STRUCTURE

CROSS REFERENCE TO RELATED APPLICATIONS

This application claims priority of Taiwan Patent Application No. 111122401 filed on Jun. 16, 2022, and also claims priority of Taiwan Patent Application No. 112118693 filed on May 19, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a feeding radiation element, a first radiation element, a second radiation element, a first coupling branch, an inductive element, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The first coupling branch is coupled through the inductive element to a first grounding point on the ground element. The first coupling branch includes an elevated portion extending across the first radiation element. The ground element, the feeding radiation element, the first radiation element, the second radiation element, the inductive element, and the first coupling branch are all disposed on the same surface of the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
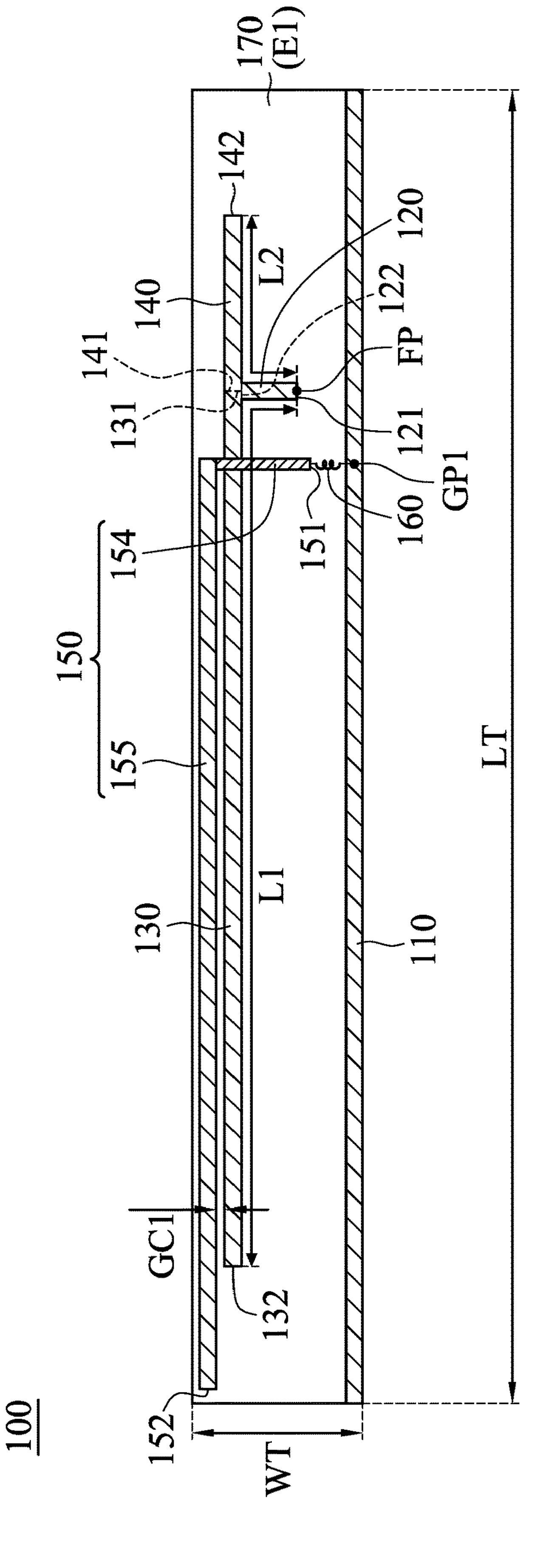
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. The antenna structure 100 may be applied to a mobile device, such as a smart phone, a tablet computer, or a notebook computer. In the embodiment of FIG. 1, the antenna structure 100 includes a ground element 110, a feeding radiation element 120, a first radiation element 130, a second radiation element 140, a first coupling branch 150, an inductive element 160, and a dielectric substrate 170. The ground element 110, the feeding radiation element 120, the first radiation element 130, the second radiation element 140, the first coupling branch 150, and the inductive element 160 may all be made of metal materials, such as copper, silver, aluminum, iron, or their alloys.

The dielectric substrate 170 may be an FR4 (Flame Retardant 4) substrate, a PCB (Printed Circuit Board), or an FPC (Flexible Printed Circuit). The ground element 110, the feeding radiation element 120, the first radiation element 130, the second radiation element 140, the first coupling branch 150, and the inductive element 160 are all disposed on the same surface E1 of the dielectric substrate 170. In some embodiments, at least one portion of the first coupling branch 150 does not directly touch the aforementioned surface E1 of the dielectric substrate 170.

The ground element 110 may be implemented with a ground copper foil, which may extend beyond the dielectric substrate 170 and may be coupled to a system ground plane (not shown).

The feeding radiation element 120 has a first end 121 and a second end 122. A feeding point FP is positioned at the first end 121 of the feeding radiation element 120. The feeding point FP may be further coupled to a signal source (not shown). For example, the aforementioned signal source may be an RF (Radio Frequency) module for exciting the antenna structure 100. The first radiation element 130 has a first end 131 and a second end 132. The first end 131 of the first radiation element 130 is coupled to the second end 122 of the feeding radiation element 120. The second end 132 of the first radiation element 130 is an open end. The second radiation element 140 has a first end 141 and a second end 142. The first end 141 of the second radiation element 140 is coupled to the second end 122 of the feeding radiation element 120. The second end 142 of the second radiation element 140 is an open end. For example, the second end 142 of the second radiation element 140 and the second end 132 of the first radiation element 130 may substantially extend in opposite directions and away from each other. In some embodiments, the combination of the feeding radiation element 120, the first radiation element 130, and the second radiation element 140 substantially has a T-shape.

The shape and type of the inductive element 160 are not limited in the invention. In some embodiments, the inductive element 160 is a lumped inductor. In alternative embodiments, the inductive element 160 is a variable inductor for providing a variable inductance.

The first coupling branch 150 has a first end 151 and a second end 152. The first end 151 of the first coupling branch 150 is coupled through the inductive element 160 to a first grounding point GP1 on the ground element 110. The second end 152 of the first coupling branch 150 is an open end. In some embodiments, the first coupling branch 150 includes an elevated portion 154 adjacent to the first end 151, and a coupling portion 155 adjacent to the second end 152. The elevated portion 154 of the first coupling branch 150 extends across the first radiation element 130. The elevated portion 154 of the first coupling branch 150 does not directly touch the first radiation element 130 at all. That is, the elevated portion 154 of the first coupling branch 150 has a vertical projection on the surface E1 of the dielectric substrate 170, and the vertical projection at least partially overlaps the first radiation element 130. In addition, the coupling portion 155 of the first coupling branch 150 is disposed on the surface E1 of the dielectric substrate 170, and is also adjacent to the first radiation element 130. A coupling gap GC1 may be formed between the coupling portion 155 of the first coupling branch 150 and the first radiation element 130. For example, the coupling portion 155 of the first coupling branch 150 may be substantially parallel to the first radiation element 130. It should be noted that the term "adjacent" or "close" throughout the disclosure means that the distance (spacing) between two corresponding elements is smaller than a predetermined distance (e.g., 5 mm or shorter), or it means that the two corresponding elements touch each other directly (i.e., the aforementioned distance/spacing therebetween is reduced to 0). In some embodiments, the first coupling branch 150 substantially has a relatively long L-shape.

According to practical measurements, the antenna structure 100 can cover a low-frequency band and a high-frequency band. For example, the low-frequency band may be from 600 MHz to 960 MHz, and the high-frequency band may be from 1100 MHz to 6000 MHz. Therefore, the antenna structure 100 can cover at least the wideband operations of LTE (Long Term Evolution) and/or next 5G (5th Generation Mobile Network) communication.

In some embodiments, the operational principles of the antenna structure 100 are described below. The feeding radiation element 120 and the first radiation element 130 are excited to generate the aforementioned low-frequency band. The feeding radiation element 120 and the second radiation element 140 are excited to generate the aforementioned high-frequency band. Also, the first coupling branch 150 is excited by the feeding radiation element 120 and the first radiation element 130 using a coupling mechanism. According to practical measurements, the incorporation of the first coupling branch 150 and the inductive element 160 can help to increase the operational bandwidth of the aforementioned low-frequency band, and to fine-tune the impedance matching of the aforementioned high-frequency band.

In some embodiments, the element sizes and parameters of the antenna structure 100 are as follows. The total length L1 of the feeding radiation element 120 and the first radiation element 130 may be shorter than or equal to 0.5 wavelength (λ/2) of the low-frequency band of the antenna structure 100. The total length L2 of the feeding radiation element 120 and the second radiation element 140 may be shorter than or equal to 0.5 wavelength (λ/2) of the high-frequency band of the antenna structure 100. The width of the first coupling gap GC1 may be shorter than or equal to 2 mm. The inductance of the inductive element 160 may be from 1 nH to 30 nH. The overall length LT of the antenna structure 100 may be shorter than or equal to 100 mm. The overall width WT of the antenna structure 100 may be shorter than or equal to 10 mm. The above ranges of element sizes and parameters are calculated and obtained according to many experiment results, and they help to optimize the operational bandwidth and impedance matching of the antenna structure 100.

The following embodiments will introduce other configurations and detailed structural features of the antenna structure 100. It should be understood that these figures and descriptions are merely exemplary, rather than limitations of the invention.

Figure 2A:
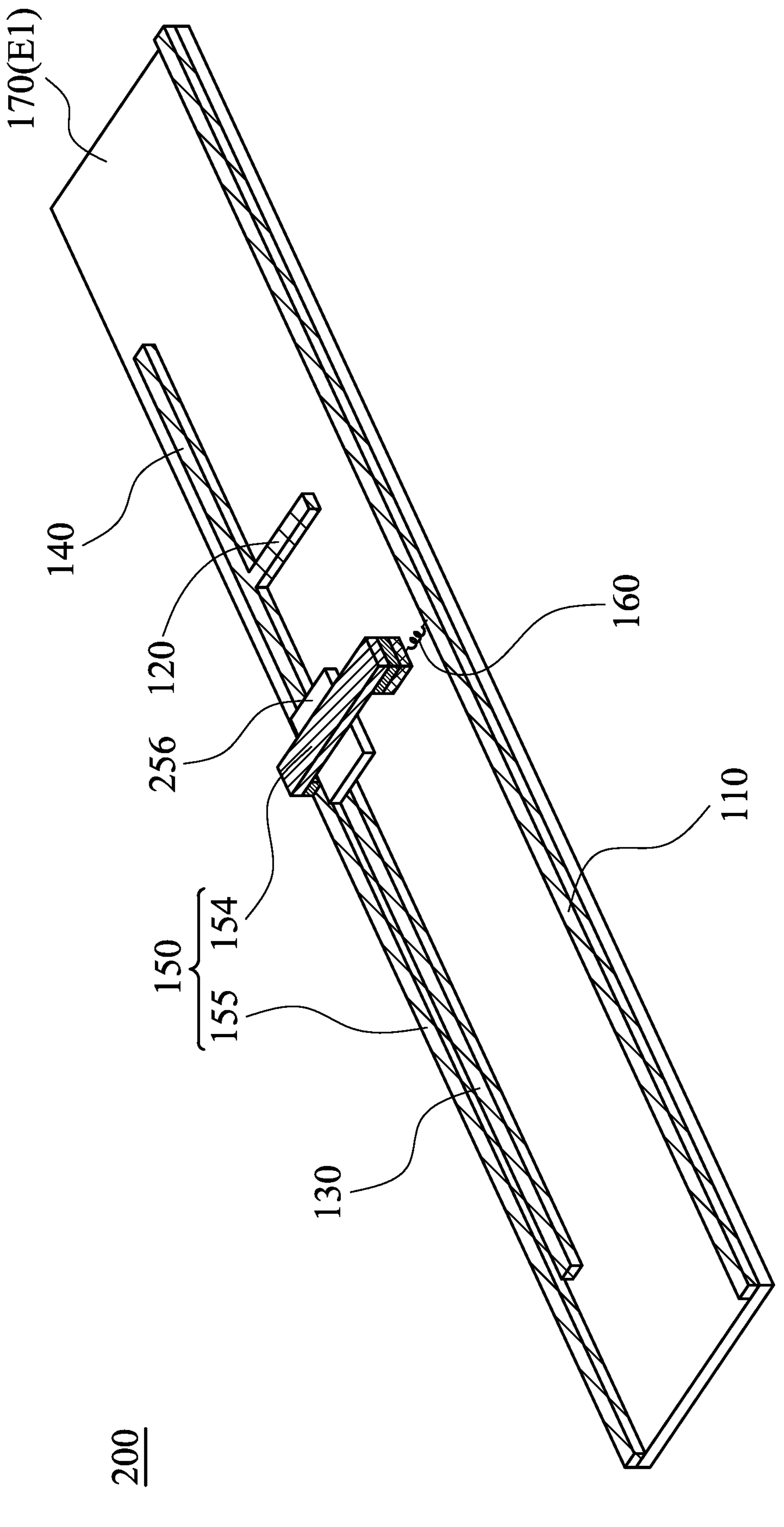
FIG. 2A is a perspective view of an antenna structure according to an embodiment of the invention.
Figure 2B:
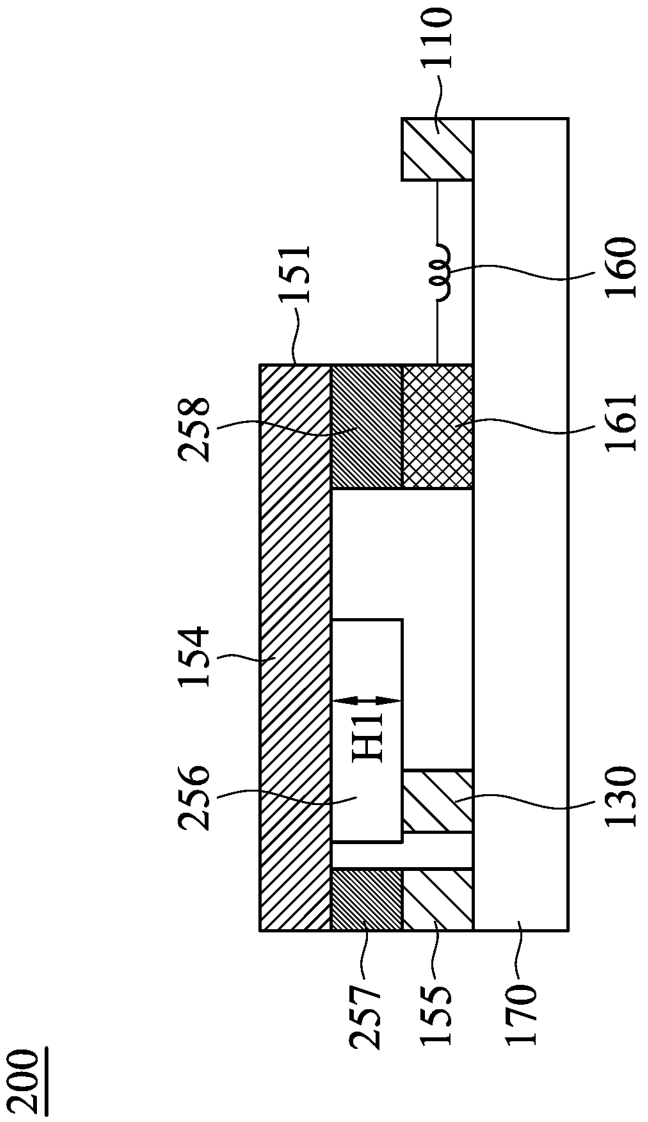
FIG. 2B is a sectional view of the antenna structure according to an embodiment of the invention.

FIG. 2A is a perspective view of an antenna structure 200 according to an embodiment of the invention. FIG. 2B is a sectional view of the antenna structure 200 according to an embodiment of the invention. Please refer to FIG. 2A and FIG. 2B together, which are similar to FIG. 1. In the embodiment of FIG. 2A and FIG. 2B, the antenna structure 200 further includes an insulation layer 256 disposed between the elevated portion 154 of the first coupling branch 150 and the first radiation element 130. For example, the insulation layer 256 may be implemented with insulation ink, insulation film, or insulation adhesive. Generally, the insulation layer 256 is configured to separate the elevated portion 154 of the first coupling branch 150 from the first radiation element 130. For example, the thickness H1 of the insulation layer 256 may be merely greater than or equal to 0.01 mm, so as to reduce the overall antenna size. Furthermore, a coupling amount between the first coupling branch 150 and the first radiation element 130 can be adjusted by changing the thickness H1 of the insulation layer 256. In some embodiments, the antenna structure 200 further includes a first soldering element 257 and a second soldering element 258, which are respectively coupled to two ends of the elevated portion 154 of the first coupling branch 150. Specifically, among the first coupling branch 150, one end of the elevated portion 154 is coupled through the first soldering element 257 to the coupling portion 155, and the other end of the elevated portion 154 is coupled through the second soldering element 258 to a terminal 161 of the inductive element 160. In some embodiments, the insulation layer 256 can be disposed between the elevated portion 154 of the first coupling branch 150 and the inductive element 160. For example, the insulation layer 256 may be positioned between the first soldering element 257 and the second soldering element 258. The insulation layer 256, the first soldering element 257, and the second soldering element 258 may all disposed on the same plane. However, the invention is not limited thereto. In alternative embodiments, the first soldering element 257 and the second soldering element 258 are replaced with two terminal extension elements of the elevated portion 154 of the first coupling branch 150, so as to achieve an all-in-one design. Other features of the antenna structure 200 of FIG. 2A and FIG. 2B are similar to those of the antenna structure 100 of FIG. 1. Accordingly, the two embodiments can achieve similar levels of performance.

Figure 3A:
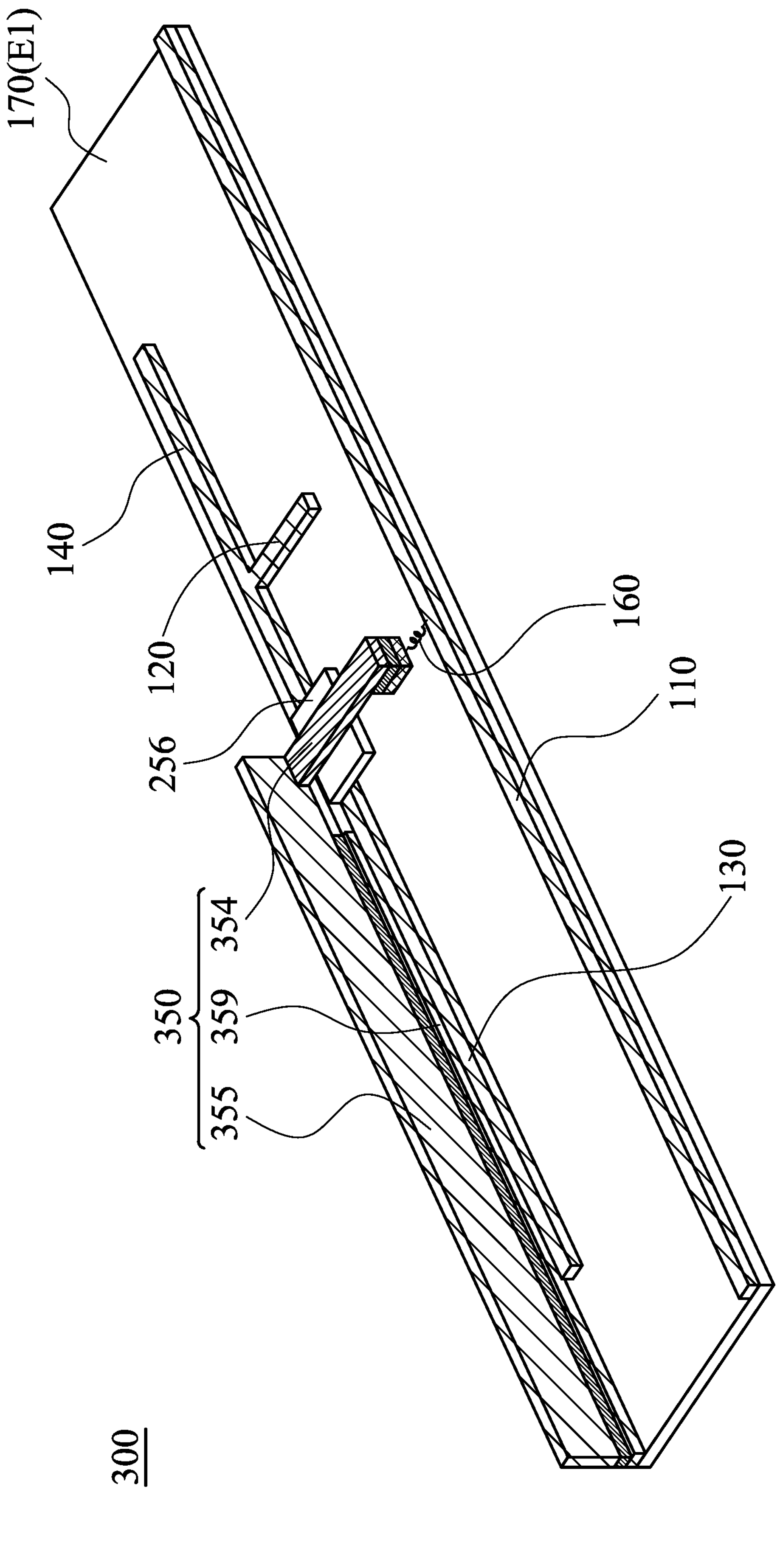
FIG. 3A is a perspective view of an antenna structure according to an embodiment of the invention.
Figure 3B:
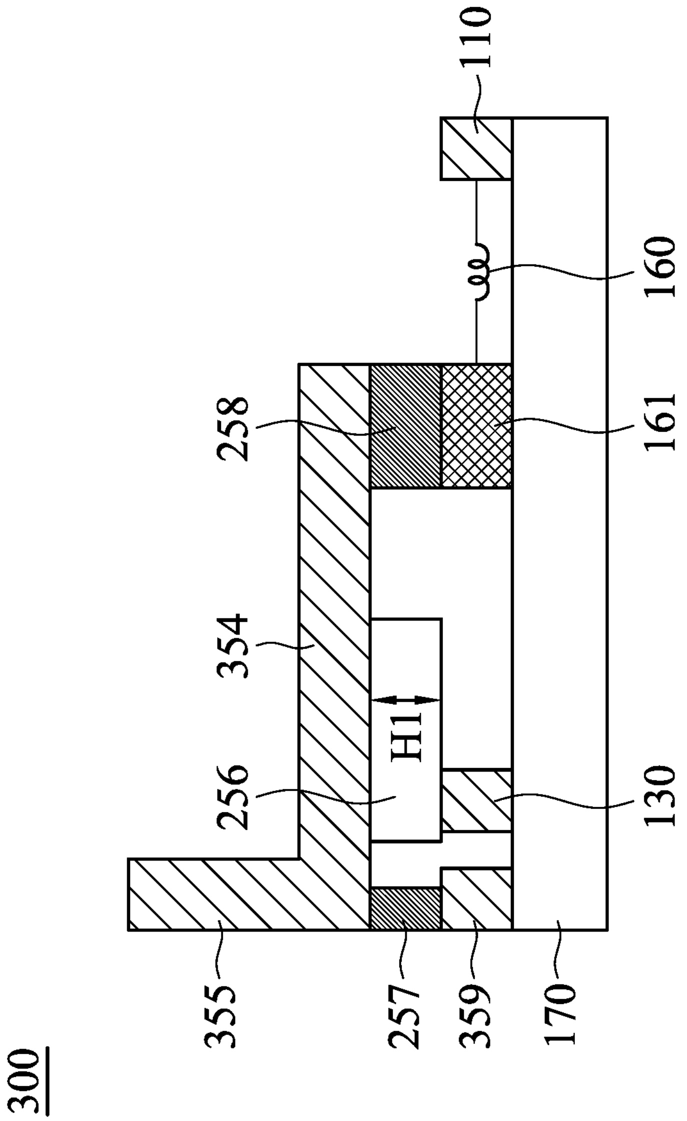
FIG. 3B is a sectional view of the antenna structure according to an embodiment of the invention.

FIG. 3A is a perspective view of an antenna structure 300 according to an embodiment of the invention. FIG. 3B is a sectional view of the antenna structure 300 according to an embodiment of the invention. Please refer to FIG. 3A and FIG. 3B together, which are similar to FIG. 2A and FIG. 2B. In the embodiment of FIG. 3A and FIG. 3B, a first coupling branch 350 of the antenna structure 300 includes an elevated portion 354, a coupling portion 355, and a supporting portion 359. The coupling portion 355 of the first coupling branch 350 is mainly implemented with a 3D (Three Dimensional) metal plate. For example, the 3D metal plate may be substantially perpendicular to the dielectric substrate 170, and it may be used to increase the coupling amount between the first coupling branch 350 and the first radiation element 130. Furthermore, among the first coupling branch 350, the supporting portion 359 is disposed on the dielectric substrate 170, and the coupling portion 355 is coupled through the first soldering element 257 to the supporting portion 359, so as to enhance the stability of the first coupling branch 350. However, the invention is not limited thereto. In alternative embodiments, both the supporting portion 359 and the first soldering element 257 are optional element, which are removable from the first coupling branch 350. Other features of the antenna structure 300 of FIG. 3A and FIG. 3B are similar to those of the antenna structure 200 of FIG. 2A and FIG. 2B. Accordingly, the two embodiments can achieve similar levels of performance.

Figure 4A:
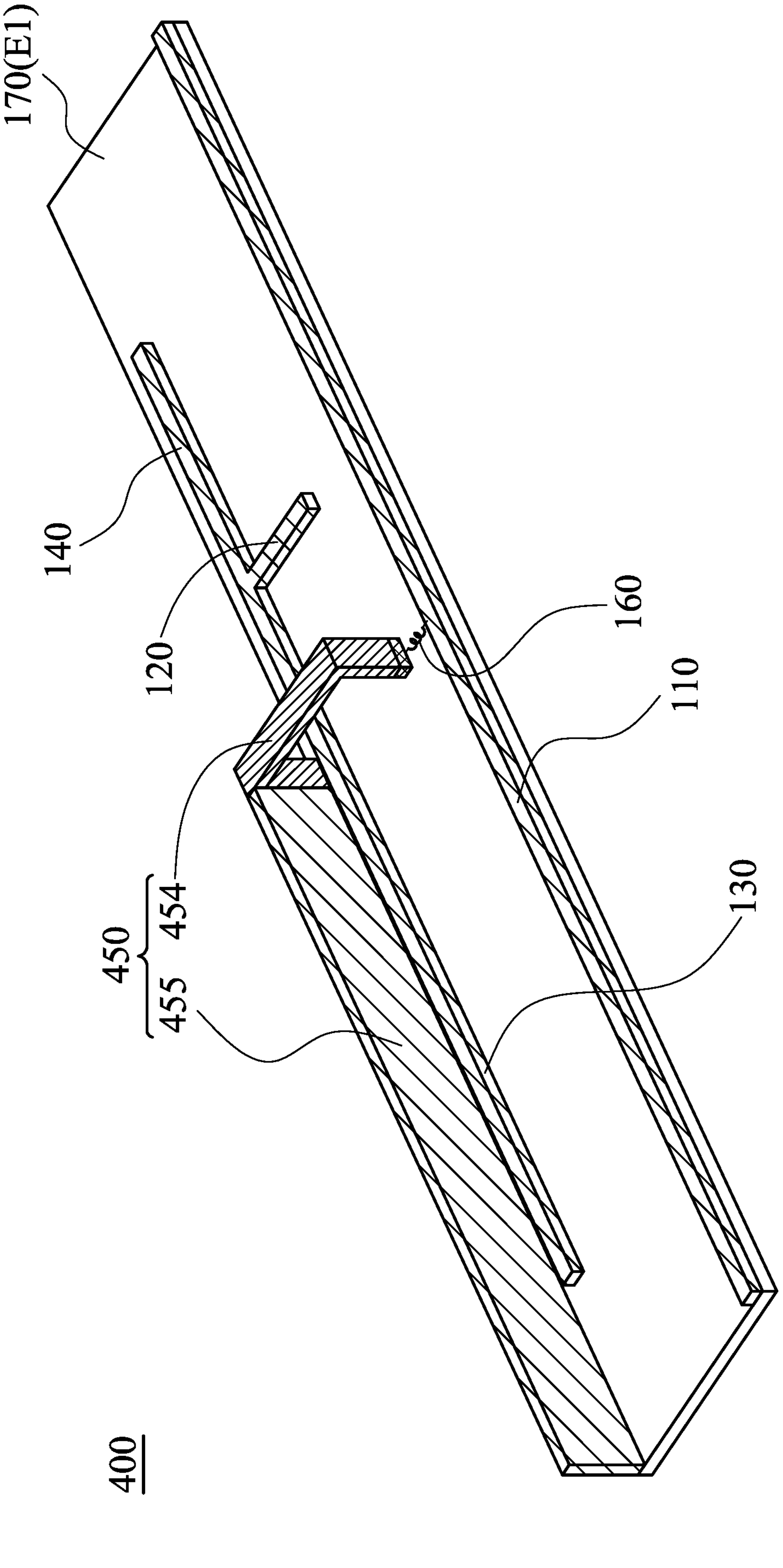
FIG. 4A is a perspective view of an antenna structure according to an embodiment of the invention.
Figure 4B:
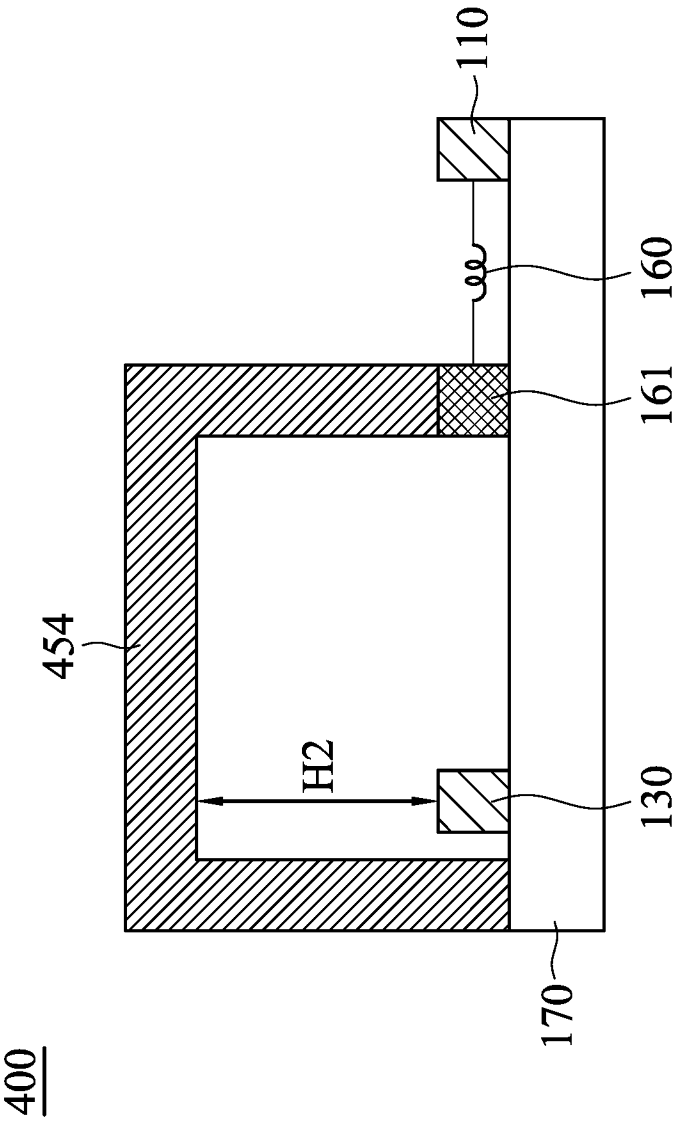
FIG. 4B is a sectional view of the antenna structure according to an embodiment of the invention.

FIG. 4A is a perspective view of an antenna structure 400 according to an embodiment of the invention. FIG. 4B is a sectional view of the antenna structure 400 according to an embodiment of the invention. Please refer to FIG. 4A and FIG. 4B together, which are similar to FIG. 1. In the embodiment of FIG. 4A and FIG. 4B, a first coupling branch 450 of the antenna structure 400 includes an elevated portion 454 and a coupling portion 455. The elevated portion 454 of the first coupling branch 450 may substantially have an inverted U-shape. The coupling portion 455 of the first coupling branch 450 is mainly implemented with a 3D metal plate. As shown in FIG. 4B, the elevated portion 454 of the first coupling branch 450 has an internal maximum height H2 on the first radiation element 130, and the internal maximum height H2 may be greater than or equal to 0.3 mm. Furthermore, as shown in FIG. 4A, the coupling portion 455 of the first coupling branch 450 can directly touch the surface E1 of the dielectric substrate 170. With such a design, even if the antenna structure 400 does not use any insulation layer, the elevated portion 454 of the first coupling branch 450 will not negatively affect the radiation performance of the first radiation element 130 so much. Other features of the antenna structure 400 of FIG. 4A and FIG. 4B are similar to those of the antenna structure 100 of FIG. 1. Accordingly, the two embodiments can achieve similar levels of performance.

Figure 5:
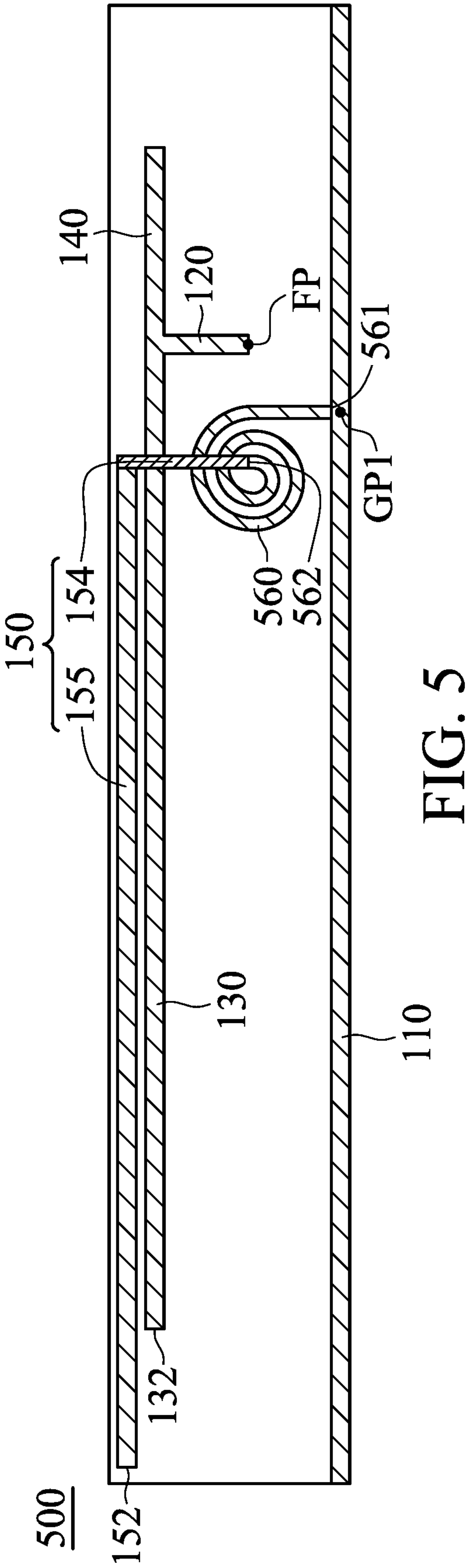
FIG. 5 is a top view of an antenna structure according to an embodiment of the invention.

FIG. 5 is a top view of an antenna structure 500 according to an embodiment of the invention. FIG. 5 is similar to FIG. 1. In the embodiment of FIG. 5, an inductive element 560 of the antenna structure 500 is a distributed inductor. For example, the inductive element 560 may substantially have a spiral shape, which may be considered as a circular coil. Specifically, the inductive element 560 has a first terminal 561 coupled to the first grounding point GP1 on the ground element 110, and a second terminal 562 coupled to the elevated portion 154 of the first coupling branch 150. Thus, the first coupling branch 150 is also coupled through the inductive element 560 to the ground element 110. Other features of the antenna structure 500 of FIG. 5 are similar to those of the antenna structure 100 of FIG. 1. Accordingly, the two embodiments can achieve similar levels of performance.

Figure 6:
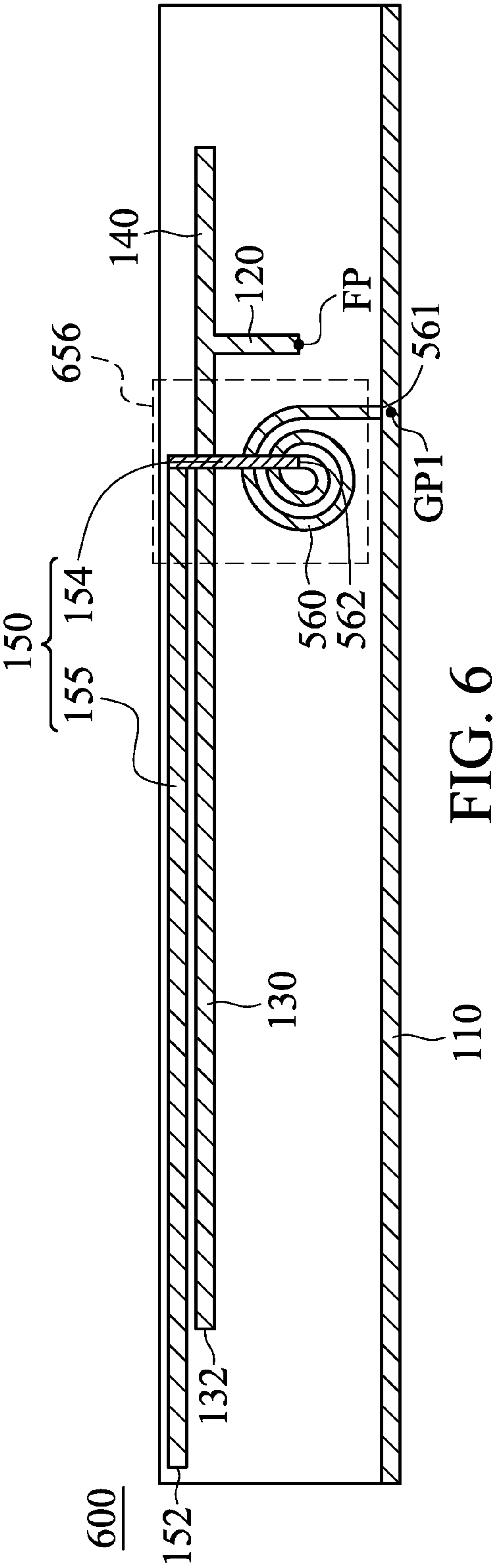
FIG. 6 is a top view of an antenna structure according to an embodiment of the invention.

FIG. 6 is a top view of an antenna structure 600 according to an embodiment of the invention. FIG. 6 is similar to FIG. 5. In the embodiment of FIG. 6, the antenna structure 600 further includes an insulation layer 656, which can cover at least one portion of the first radiation element 130 and also cover the whole inductive element 560. For example, the insulation layer 656 may be implemented with insulation ink, insulation film, or insulation adhesive. The insulation layer 656 is configured to separate the elevated portion 154 of the first coupling branch 150 from the first radiation element 130 and the inductive element 560. For example, the elevated portion 154 of the first coupling branch 150 may be positioned above the insulation layer 656, and both the first radiation element 130 and the inductive element 560 may be positioned below the insulation layer 656. Furthermore, the insulation layer 656 may have some openings. Thus, there may be a current path from the coupling portion 155 through the elevated portion 154 of the first coupling branch 150 to the inductive element 560. Other features of the antenna structure 600 of FIG. 6 are similar to those of the antenna structure 500 of FIG. 5. Accordingly, the two embodiments can achieve similar levels of performance.

Figure 7A:
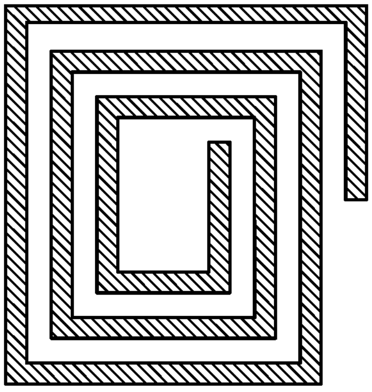
FIG. 7A is a top view of an inductive element according to an embodiment of the invention.
Figure 7B:
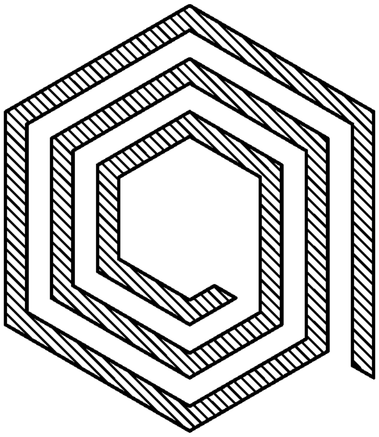
FIG. 7B is a top view of an inductive element according to an embodiment of the invention.
Figure 7C:
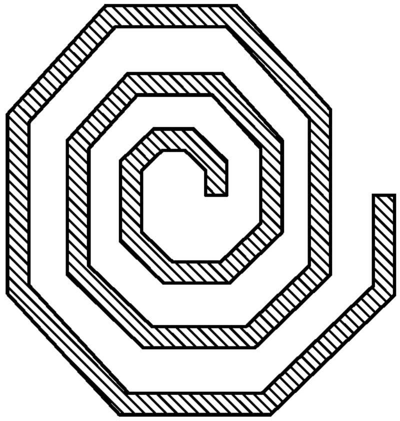
FIG. 7C is a top view of an inductive element according to an embodiment of the invention.

FIG. 7A is a top view of an inductive element 761 according to an embodiment of the invention. FIG. 7B is a top view of an inductive element 762 according to an embodiment of the invention. FIG. 7C is a top view of an inductive element 763 according to an embodiment of the invention. It should be understood that in addition to the above circular coils, the shape of each inductive element of the invention is adjustable according to different requirements. For example, a square coil, a hexagonal coil, or an octagonal coil may be applied to any embodiment of the invention.

Figure 8:
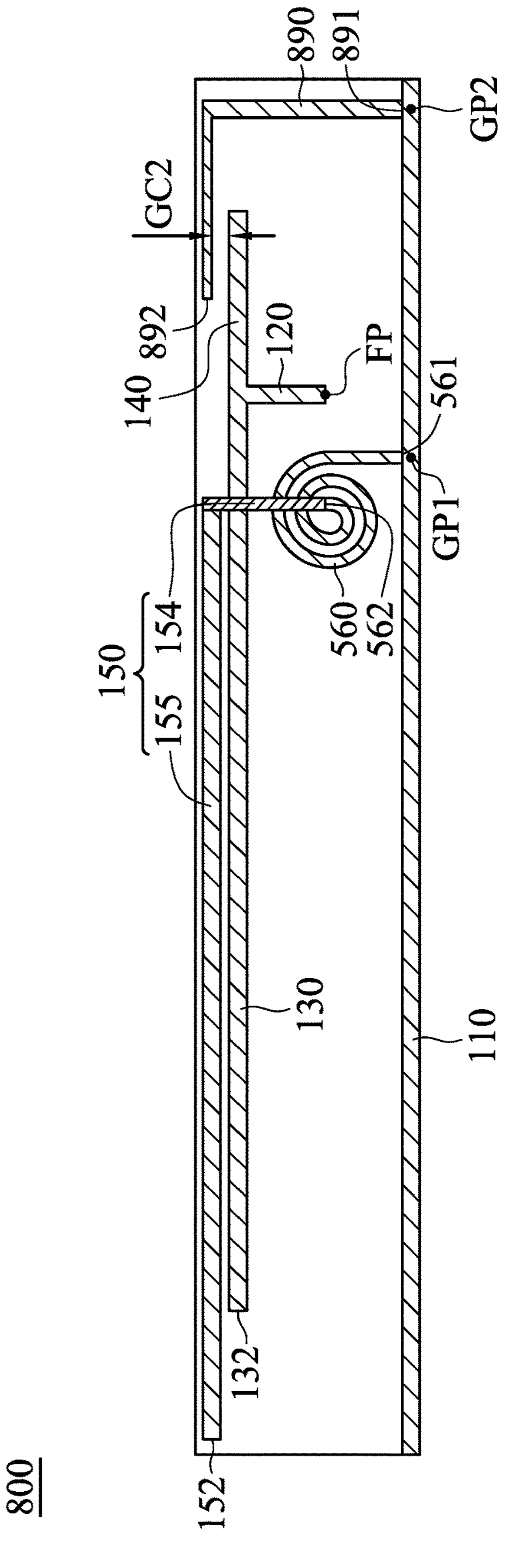
FIG. 8 is a top view of an antenna structure according to an embodiment of the invention.

FIG. 8 is a top view of an antenna structure 800 according to an embodiment of the invention. FIG. 8 is similar to FIG. 5. In the embodiment of FIG. 8, the antenna structure 800 further includes a second coupling branch 890, which may be made of a metal material. The second coupling branch 890 may substantially have an L-shape. Specifically, the second coupling branch 890 has a first end 891 and a second end 892. The first end 891 of the second coupling branch 890 is coupled to a second grounding point GP2 on the ground element 110. The second end 892 of the second coupling branch 890 is an open end. The second grounding point GP2 may be different from the aforementioned first grounding point GP1. For example, if the first grounding point GP1 is positioned at one side of the feeding radiation element 120, the second grounding point GP2 may be positioned at the opposite side of the feeding radiation element 120. The second end 892 of the second coupling branch 890, the second end 152 of the first coupling branch 150, and the second end 132 of the first radiation element 130 may substantially extend toward the same direction. In addition, the second coupling branch 890 is disposed adjacent to the second radiation element 140. A second coupling gap GC2 may be formed between the second coupling branch 890 and the second radiation element 140. For example, the width of the second coupling gap GC2 may be shorter than or equal to 2 mm. According to practical measurements, the incorporation of the second coupling branch 890 can help to increase the operational bandwidth of the high-frequency band of the antenna structure 800. Other features of the antenna structure 800 of FIG. 8 are similar to those of the antenna structure 500 of FIG. 5. Accordingly, the two embodiments can achieve similar levels of performance.

The invention proposes a novel antenna structure. In comparison to the conventional design, the invention has at least the advantages of small size, wide bandwidth, single circuit board, and low manufacturing cost. Therefore, the invention is suitable for application in a variety of mobile communication devices.

Note that the above element sizes, element shapes, element parameters, and frequency ranges are not limitations of the invention. An antenna designer can fine-tune these settings or values according to different requirements. It should be understood that the antenna structure of the invention is not limited to the configurations of FIGS. 1-8. The invention may merely include any one or more features of any one or more embodiments of FIGS. 1-8. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a feeding radiation element, having a feeding point;

a first radiation element, coupled to the feeding radiation element;

a second radiation element, coupled to the feeding radiation element, wherein the second radiation element and the first radiation element substantially extend in opposite directions;

an inductive element;

a first coupling branch, coupled through the inductive element to a first grounding point on the ground element, wherein the first coupling branch comprises an elevated portion extending across the first radiation element; and a dielectric substrate, wherein the ground element, the feeding radiation element, the first radiation element, the second radiation element, the inductive element, and the first coupling branch are disposed on a same surface of the dielectric substrate.

2. The antenna structure as claimed in claim 1, wherein a combination of the feeding radiation element, the first radiation element, and the second radiation element substantially has a T-shape.

3. The antenna structure as claimed in claim 1, wherein the antenna structure covers a low-frequency band and a high-frequency band.

4. The antenna structure as claimed in claim 3, wherein the low-frequency band is from 600 MHz to 960 MHz, and the high-frequency band is from 1100 MHz to 6000 MHz.

5. The antenna structure as claimed in claim 3, wherein a total length of the feeding radiation element and the first radiation element is shorter than or equal to 0.5 wavelength of the low-frequency band.

6. The antenna structure as claimed in claim 3, wherein a total length of the feeding radiation element and the second radiation element is shorter than or equal to 0.5 wavelength of the high-frequency band.

7. The antenna structure as claimed in claim 1, wherein the inductive element is a lumped inductor.

8. The antenna structure as claimed in claim 1, wherein the inductive element is a distributed inductor.

9. The antenna structure as claimed in claim 1, wherein an inductance of the inductive element is from 1 nH to 30 nH.

10. The antenna structure as claimed in claim 1, wherein the elevated portion of the first coupling branch does not directly touch the first radiation element at all.

11. The antenna structure as claimed in claim 1, wherein the first coupling branch further comprises a coupling portion adjacent to the first radiation element.

12. The antenna structure as claimed in claim 11, wherein the coupling portion of the first coupling branch is substantially parallel to the first radiation element.

13. The antenna structure as claimed in claim 11, wherein a coupling gap is formed between the coupling portion of the first coupling branch and the first radiation element, and a width of the first coupling gap is shorter than or equal to 2 mm.

14. The antenna structure as claimed in claim 1, further comprising:

an insulation layer, disposed between the elevated portion of the first coupling branch and the first radiation element.

15. The antenna structure as claimed in claim 14, wherein the insulation layer is further disposed between the elevated portion of the first coupling branch and the inductive element.

16. The antenna structure as claimed in claim 11, wherein the coupling portion of the first coupling branch is a 3D (Three-Dimensional) metal plate.

17. The antenna structure as claimed in claim 16, wherein the 3D metal plate is substantially perpendicular to the dielectric substrate.

18. The antenna structure as claimed in claim 1, wherein the elevated portion of the first coupling branch substantially has an inverted U-shape.

19. The antenna structure as claimed in claim 1, further comprising:

a second coupling branch, coupled to a second grounding point on the ground element, wherein the second coupling branch is adjacent to the second radiation element.

20. The antenna structure as claimed in claim 19, wherein a second coupling gap is formed between the second coupling branch and the second radiation element, and a width of the second coupling gap is shorter than or equal to 2 mm.

* * * * *